(12) United States Patent
Vega et al.

(10) Patent No.: US 12,280,682 B2
(45) Date of Patent: Apr. 22, 2025

(54) EJECTOR FOR ELECTRIC VEHICLE CHARGING CONNECTORS

(71) Applicant: EVject, Inc., American Fork, UT (US)

(72) Inventors: Erick Vega, Salt Lake City, UT (US); Preston Ruff, Draper, UT (US); Kreg Peeler, Draper, UT (US)

(73) Assignee: EVject, Inc., American Fork, UT (US)

( * ) Notice: Subject to any disclaimer, the term of this patent is extended or adjusted under 35 U.S.C. 154(b) by 732 days.

(21) Appl. No.: 17/565,096

(22) Filed: Dec. 29, 2021

(65) Prior Publication Data

US 2023/0158902 A1 May 25, 2023

Related U.S. Application Data (60) Provisional application No. 63/282,671, filed on Nov. 23, 2021.

(51) Int. Cl.
| | |
|---|---|
| *B60L 53/16* | (2019.01) |
| *H01R 13/633* | (2006.01) |
| *H01R 13/635* | (2006.01) |
| *H01R 13/639* | (2006.01) |

(52) U.S. Cl.
CPC .......... *B60L 53/16* (2019.02); *H01R 13/6335* (2013.01); *H01R 13/635* (2013.01); *H01R 13/639* (2013.01); *H01R 2201/26* (2013.01)

(58) Field of Classification Search
CPC ...... B60L 53/16; H01R 13/633; H01R 13/635
See application file for complete search history.

(56) References Cited

U.S. PATENT DOCUMENTS

| | | | | |
|---|---|---|---|---|
| 2,688,734 A | * | 9/1954 | Welling | H01R 13/635 200/51 R |
| 2,710,384 A | * | 6/1955 | Dupre | H01R 13/633 89/1.51 |
| 2,746,021 A | * | 5/1956 | Butkovich | H01R 13/20 439/155 |

(Continued)

FOREIGN PATENT DOCUMENTS

| | | |
|---|---|---|
| DE | 102019106282 A1 | 9/2020 |
| KR | 452236 Y1 | 2/2011 |

(Continued)

OTHER PUBLICATIONS

International Searching Authority, International Search Report and the Written Opinion, Mar. 8, 2023.

*Primary Examiner* — Neil Abrams
(74) *Attorney, Agent, or Firm* — Kirton McConkie; Brian Tucker (57) ABSTRACT

An ejector for electric vehicle charging connectors is provided. An ejector can be configured to be secured on the inside of the charging port of an EV and to automatically eject or push the charging connector from the charging port. The ejector may include a pusher assembly that can be selectively retracted to allow a charging connector to be plugged into the charging port and can be selectively released to eject the charging connector from the charging port. The ejector can include a retracting assembly for selectively retracting the pusher assembly and a locking assembly for retaining the pusher assembly in the retracted position until it is desired to eject the charging connector.

18 Claims, 12 Drawing Sheets

(56) References Cited

U.S. PATENT DOCUMENTS

| | | | | |
|---|---|---|---|---|
| 3,431,428 A * | 3/1969 | Valer | ................ | B60H 1/00014 |
| | | | | 439/153 |
| 3,475,715 A * | 10/1969 | Venaleck | ............. | H01R 13/635 |
| | | | | 439/159 |
| 3,598,941 A * | 8/1971 | Nelson | ............... | H01R 13/7036 |
| | | | | 200/51.09 |
| 3,843,854 A * | 10/1974 | Mori | ...................... | H01H 13/40 |
| | | | | 200/51.09 |
| 4,157,855 A * | 6/1979 | Chan | .................... | H01R 13/635 |
| | | | | 439/923 |
| 5,383,790 A | 1/1995 | Kerek et al. | | |
| 5,645,439 A | 7/1997 | Nugent, Jr. et al. | | |
| 5,800,189 A | 9/1998 | Ahmed | | |
| 7,121,854 B2 * | 10/2006 | Buck | .................. | H01M 50/262 |
| | | | | 439/160 |
| 7,234,953 B2 * | 6/2007 | Chen | ................. | H01R 13/6335 |
| | | | | 439/152 |
| 7,344,393 B2 * | 3/2008 | Buller | ................. | H01R 13/635 |
| | | | | 439/152 |
| 8,968,021 B1 | 3/2015 | Kennedy et al. | | |
| 10,446,990 B2 * | 10/2019 | Dykas | ................ | H01R 13/7038 |
| 10,454,212 B2 | 10/2019 | Nugent, Jr. | | |
| 11,634,044 B2 * | 4/2023 | Johnson, III | ............. | B60L 53/16 |
| | | | | 320/109 |
| 2002/0064983 A1 * | 5/2002 | Patey | ................... | H01R 13/635 |
| | | | | 439/152 |
| 2004/0266236 A1 * | 12/2004 | Hughes | ................... | B60R 19/48 |
| | | | | 439/152 |
| 2013/0078839 A1 | 3/2013 | Musk et al. | | |
| 2014/0162481 A1 | 6/2014 | Han et al. | | |
| 2018/0201145 A1 | 7/2018 | Yellambalase et al. | | |
| 2021/0006010 A1 | 1/2021 | Schreiber et al. | | |
| 2021/0086640 A1 | 3/2021 | Cole et al. | | |
| 2023/0158903 A1 * | 5/2023 | Vega | ....................... | B60L 53/16 |
| | | | | 439/160 |

FOREIGN PATENT DOCUMENTS

| | | |
|---|---|---|
| KR | 200452236 Y1 | 2/2011 |
| WO | 2006081820 A1 | 8/2006 |

* cited by examiner

EJECTOR FOR ELECTRIC VEHICLE CHARGING CONNECTORS

CROSS-REFERENCE TO RELATED APPLICATIONS

This application claims the benefit of U.S. Provisional Patent Application No. 63/282,671 which was filed on Nov. 23, 2021.

BACKGROUND

Figure 1A:
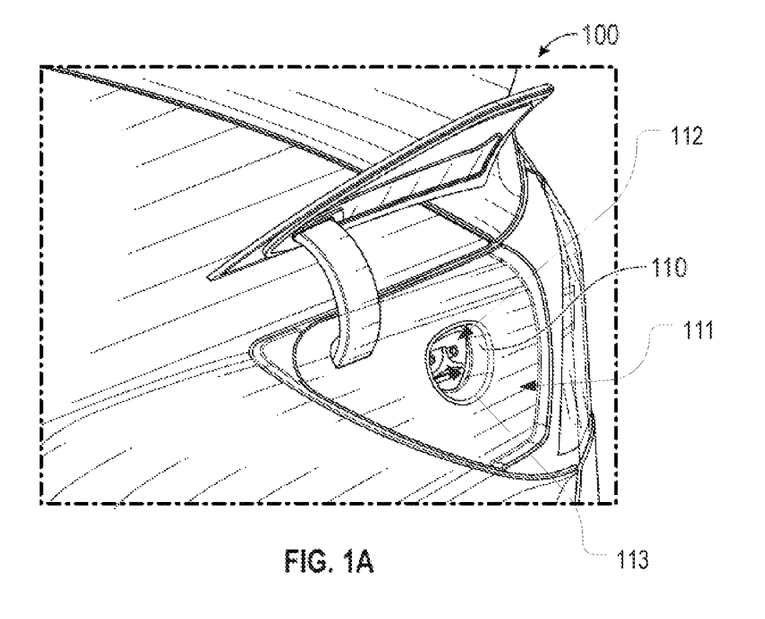
FIGS. 1A-1D provide an example of an electric vehicle charging system with which an ejector configured in accordance with embodiments of the present invention may be used.
Figure 1B:
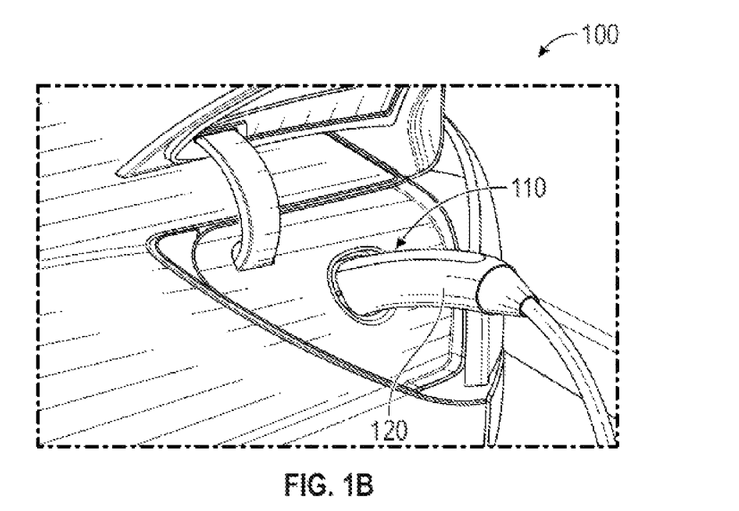

Electric vehicles (or EVs), whether cars, trucks or otherwise, must be frequently recharged. For this purpose, EVs have charging ports that are typically located on the side of the EV. FIGS. 1A and 1B provide an example of a Tesla 100 that has a charging port 110 into which a charging connector 120 can be plugged. Charging connector 120 can be electrically connected to a power source such as a 240-volt outlet at home or a public charging station. Other makes of EVs have similar charging ports that require similar charging connectors.

Figure 1C:
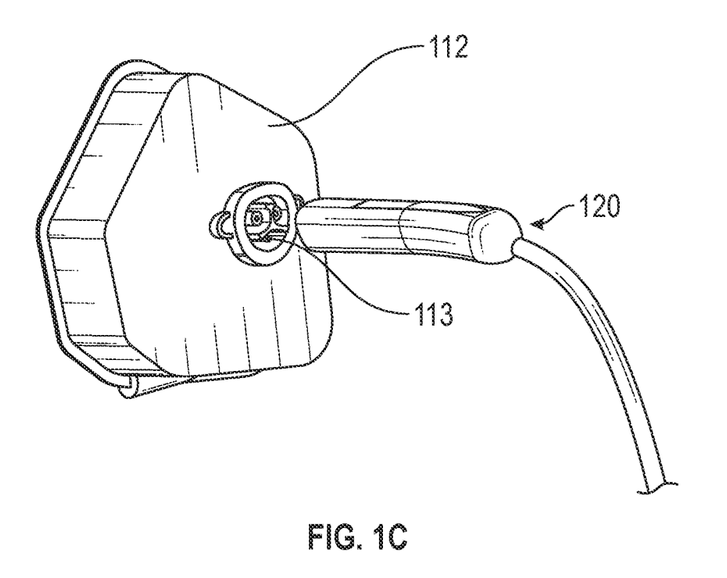
Figure 1D:
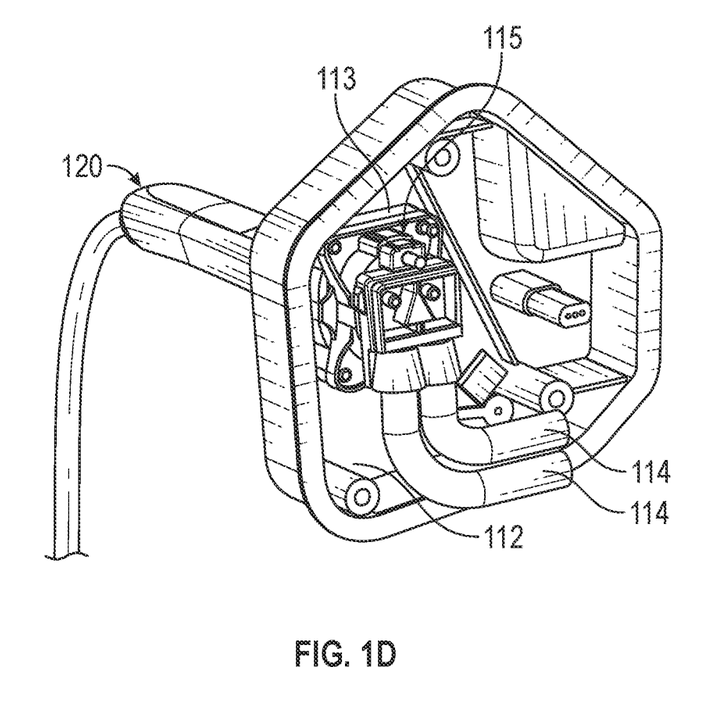

Charging port 110 may be formed of an outer cover 111 that forms an opening that exposes an internal housing 112 which forms a socket 113. Charging connector 120 is physically inserted into socket 113 to form the necessary electrical connections. FIGS. 1C and 1D are isolated external and internal views respectively of charging port 110 when outer cover 111 is removed. As is visible in FIG. 1D, a contact housing 115 may be secured to internal housing 112 surrounding socket 113 and may include the electrical contacts for forming the electrical connection. Wires 114 may connect the contacts of contact housing 115 to the battery of Tesla 100. Although this example is specific to Tesla 100, similar charging port configurations are employed on other types of EVs.

It can take a relatively long time to fully charge an EV. For example, with a typical 240-volt at-home charger, a full charge may take 8 hours. Even with high-voltage superchargers, it usually takes at least 30-40 minutes to reach a full charge.

Most EVs are designed to prevent any motion of the EV while the EV is connected to a charger. Therefore, the vehicle must remain parked while connected to the charger and cannot be shifted to drive, reverse, or neutral. Additionally, current charger designs require manual removal of the charging connector from the charging port. This can create various difficulties. For example, if a driver is in a rush to leave, he or she may forget to unplug the charger before getting into the EV. Similarly, if a driver's hands are full, he or she may have difficulty removing the charging connector from the charging port and managing the storage of the charging cable.

Greater difficulties may arise in scenarios where the driver is waiting in the EV while it charges. For example, a thunderstorm or other severe weather could occur when charging is complete thus forcing the driver to brave the elements to unplug the EV. As another example, a charging station may be in a remote or dangerous location where it may be unsafe for the driver to exit the EV such as due to the presence of wildlife or a lurking assailant. In such cases, the driver will in essence be trapped inside the EV given that he or she cannot drive away until the EV is unplugged.

BRIEF SUMMARY

The present invention extends to an ejector for electric vehicle charging connectors. An ejector can be configured to be secured on the inside of the charging port of an EV and to automatically eject or push the charging connector from the charging port. The ejector may include a pusher assembly that can be selectively retracted to allow a charging connector to be plugged into the charging port and can be selectively released to eject the charging connector from the charging port. The ejector can include a retracting assembly for selectively retracting the pusher assembly and a locking assembly for retaining the pusher assembly in the retracted position until it is desired to eject the charging connector.

In some embodiments, the present invention may be implemented as an ejector that includes one or more pusher assemblies that are configured to push a connector from a socket, one or more retracting assemblies that are configured to move the one or more pusher assemblies into a retracted position, and a locking assembly that is configured to retain the one or more pusher assemblies in the retracted position until a signal is received to eject the connector from the socket.

In some embodiments, each of the one or more pusher assemblies may include a pusher and a shaft.

In some embodiments, each pusher may be configured to extend through a housing surrounding the socket.

In some embodiments, each of the one or more retracting assemblies includes a grabber assembly that interfaces with the shaft of the corresponding pusher assembly to move the pusher assembly into the retracted position.

In some embodiments, the grabber assembly includes opposing grabbers that interface with a flange of the shaft of the corresponding pusher assembly.

In some embodiments, the grabber assembly selectively pivots the opposing grabbers between an open position and a closed position.

In some embodiments, each of the one or more retracting assemblies includes a driving assembly that moves the corresponding grabber assembly.

In some embodiments, the locking assembly interfaces with the shaft of the one or more pusher assemblies to retain the one or more pusher assemblies in the retracted position.

In some embodiments, each of the one or more pusher assemblies includes a spring that forces the corresponding pusher against the connector when the locking assembly releases the one or more pusher assemblies from the retracted position.

In some embodiments, the locking assembly includes one or more arms that interface with a flange on the shaft of the one or more pusher assemblies.

In some embodiments, the present invention may be implemented as an ejector for a charging connector. The ejector may include a housing configured to be secured to a housing of a charging port and a pusher assembly having a pusher that is configured to be selectively extended through the housing of the charging port. The pusher may be coupled to a shaft. The ejector may also include a retracting assembly having a grabber assembly and a driving assembly for driving the grabber assembly. The grabber assembly may be configured to interface with the shaft to transition the pusher into a retracted position. The ejector may further include a locking assembly that interfaces with the shaft to retain the pusher in the retracted position. The locking assembly may be configured to release the shaft to thereby enable the pusher to extend through the housing of the charging port to eject a charging connector.

In some embodiments, the pusher may extend through a cutout formed in the housing of the charging port.

In some embodiments, the shaft may include a flange and the grabber assembly may include one or more grabbers that interface with the flange.

In some embodiments, the locking assembly may include an arm that interfaces with a flange of the shaft.

In some embodiments, the pusher assembly may include a spring that is compressed between the pusher and the housing when the pusher is in the retracted position.

In some embodiments, the shaft may have a front flange and a rear flange, the grabber assembly may interface with the rear flange to transition the pusher into the retracted position, and the locking assembly may interface with the front flange to retain the pusher in the retracted position.

In some embodiments, the present invention may be implemented as an ejector that includes a housing, opposing pusher assemblies, each pusher assembly having a pusher, opposing retracting assemblies, each retracting assembly having a grabber assembly that retracts the corresponding pusher assembly into a retracted position, and a locking assembly that locks the pusher assemblies in the retracted position. The locking assembly may be configured to release the pusher assemblies from the retracted position in response to a signal.

In some embodiments, the housing may be coupled to an interior side of a housing of a charging port of an electric vehicle.

In some embodiments, each pusher may extend through the housing of the charging port of the electric vehicle.

In some embodiments, each pusher assembly may include a spring that is compressed when the pusher assembly in retracted into the retracted position.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention encompass ejectors that are configured to enable the driver (or other user) to automatically eject (or remove) the charging connector from the charging port of an EV. As a result, the driver need not exit the EV or be present at the EV to eject the charging connector. Any suitable mechanism could be used to communicate with the ejector to cause it to eject the charging connector including any wired or wireless connection. In some embodiments, a communication mechanism may be integrated into the EV. In other embodiments, a separate device, such as a mobile application or fob, may be used to communicate with the ejector.

Figure 2:
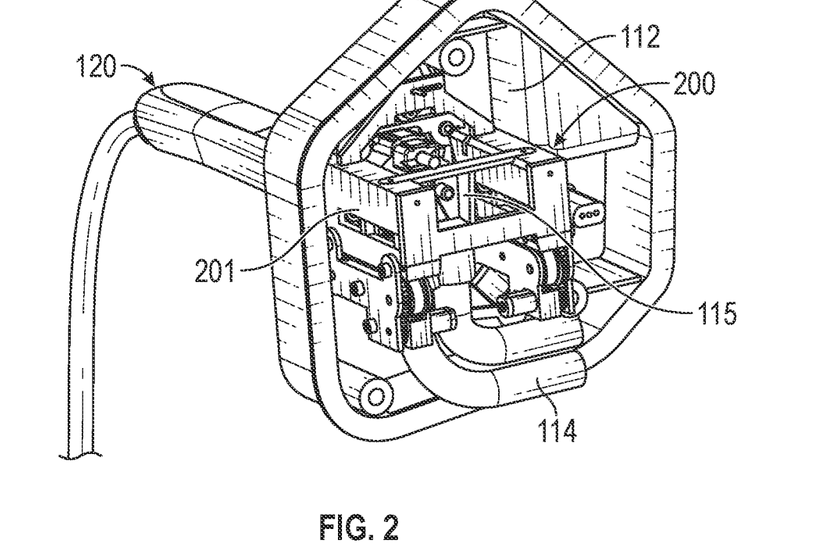
FIG. 2 provides an example of how an ejector configured in accordance with embodiments of the present invention may be integrated into the electric vehicle charging system shown in FIGS. 1A-1D.
Figure 2A:
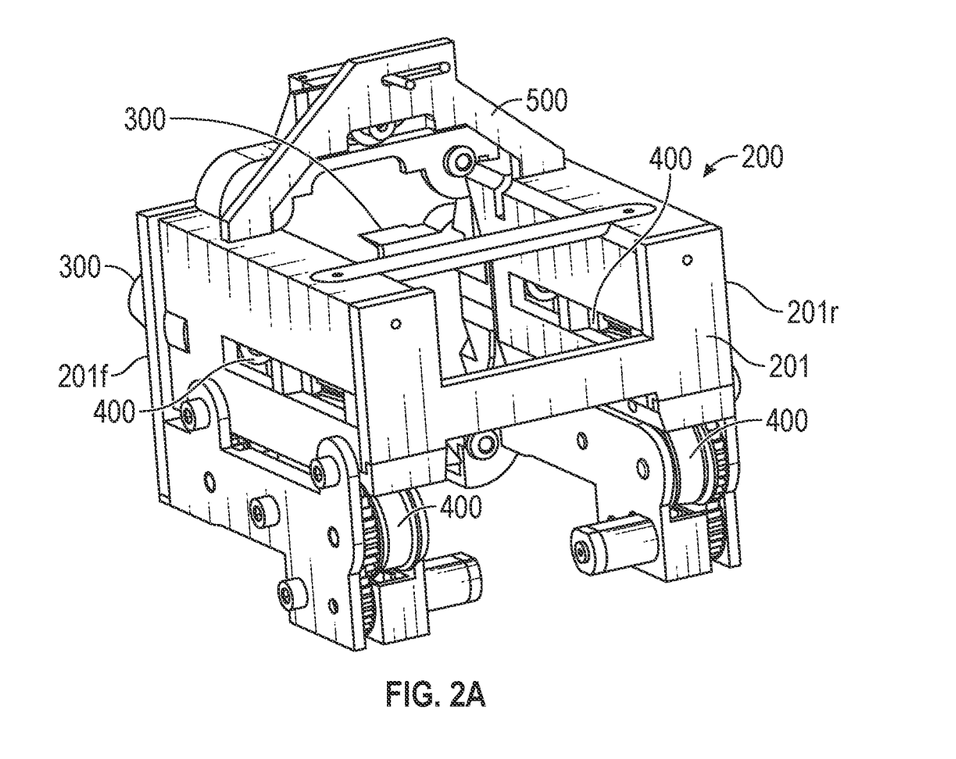
FIGS. 2A-2E are rear perspective, front perspective, top, side, and bottom views respectively of the ejector of FIG. 2 in isolation.
Figure 2B:
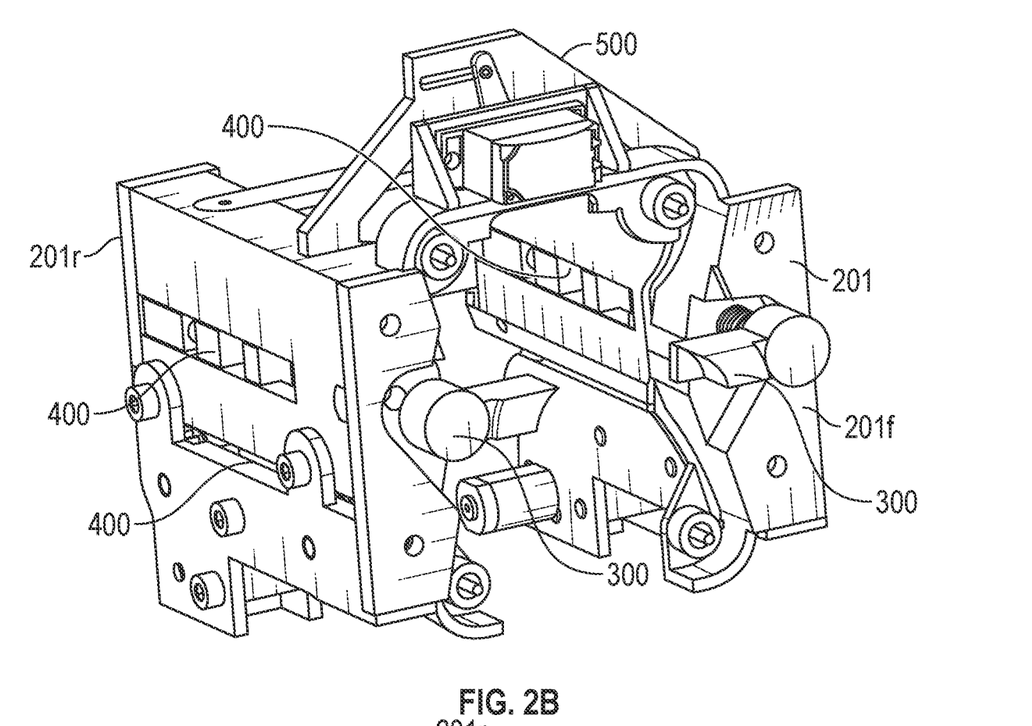
Figure 2C:
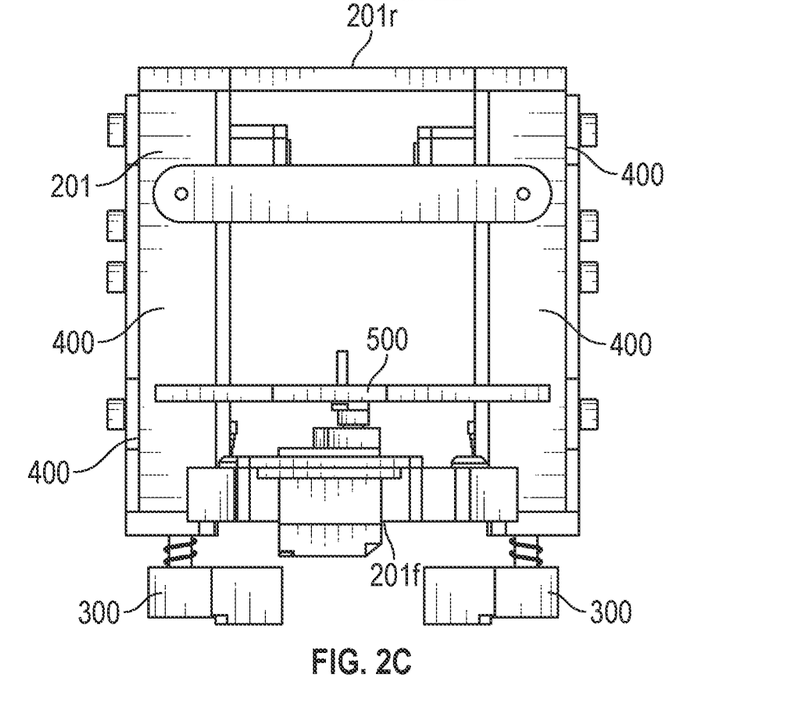
Figure 2D:
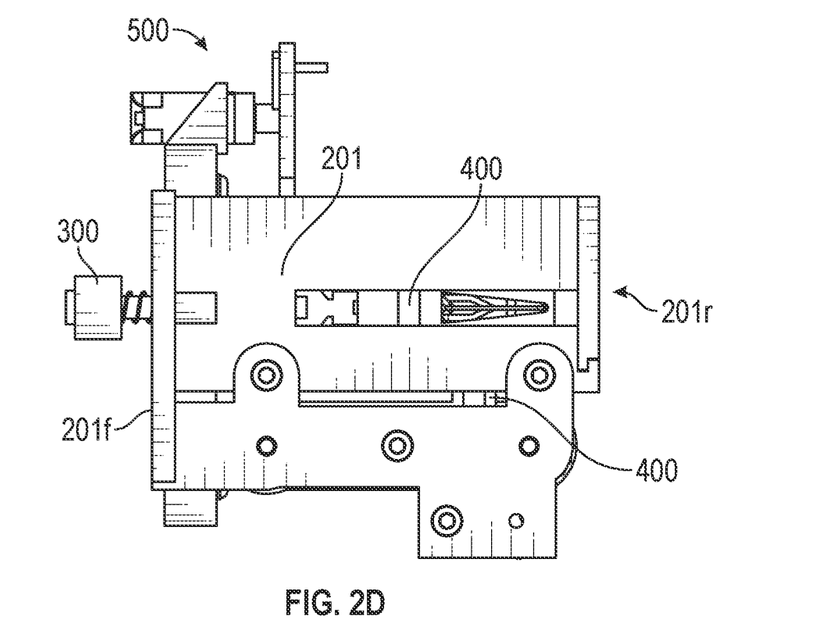
Figure 2E:
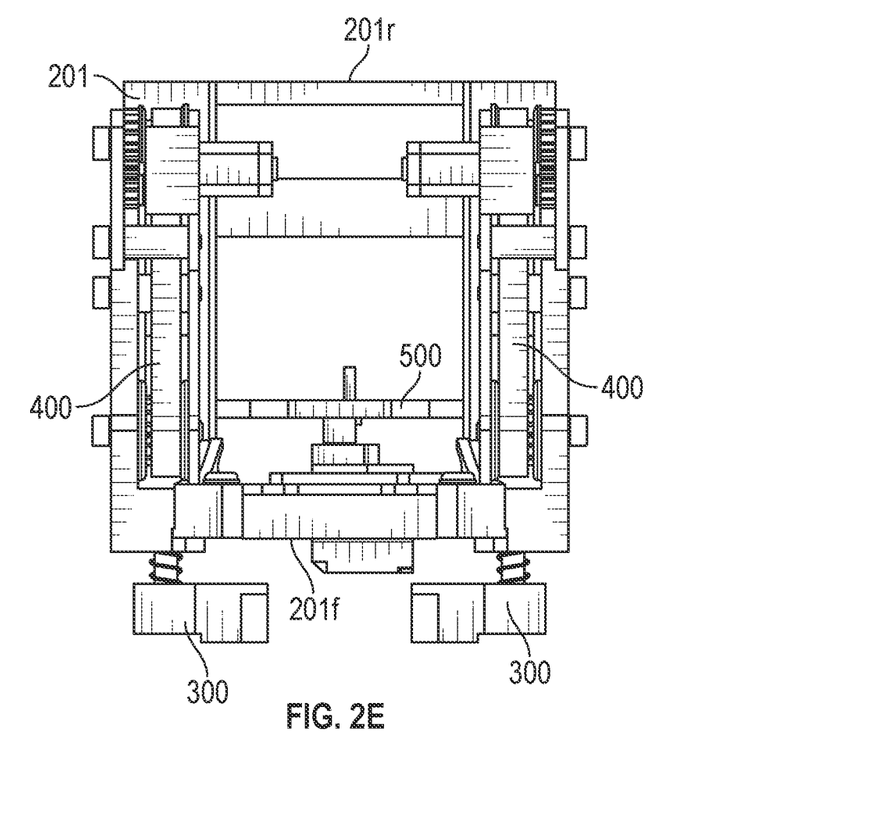

FIG. 2 shows an example of an ejector 200 that is configured in accordance with embodiments of the present invention when it is secured to internal housing 112 of charging port 110 of Tesla 100. It is noted, however, that ejector 200 could be used with a charging port of any other EV. Also, an ejector configured in accordance with embodiments of the present invention could be used to eject other types of connectors, and therefore, embodiments of the present invention should not be limited to charging port scenarios.

Ejector 200 includes a housing 201 that is configured to be coupled or mounted to the inside of internal housing 112 and surrounds or is adjacent to socket 113 and contact housing 115 and can accommodate wires 114. Housing 201 could be secured to internal housing 112 or to any other component of a charging port in any suitable manner including by screws, welding, an adhesive, etc. For example, a front 201f of housing 201 could be positioned against internal housing 112 and secured thereto via one or more screws, while a rear 201r of housing 201 could be overtop contact housing 115.

FIGS. 2A-2E are rear perspective, front perspective, top, side, and bottom views respectively of ejector 200 in isolation. As shown, ejector 200 may include one or more pusher assemblies 300 (two are included in the depicted embodiment), one or more retracting assemblies 400 (two are included in the depicted embodiment) and a locking assembly 500.

As an overview, each pusher assembly 300 is configured to be retracted into/towards and locked within/against housing 201 and then selectively released to apply a force on the charging connector to thereby eject it from the charging port. Each retracting assembly 400 is configured to retract a corresponding pusher assembly 300. Locking assembly 500 is configured to lock each pusher assembly 300 in the retracted/loaded position. As in the depicted embodiment, it may be preferable to include a pair of pushing assemblies 300 positioned on opposing sides of socket 113 so that they may apply an evenly distributed force on opposing sides of charging connector 120. However, in some embodiments, a single pushing assembly 300 could be sufficient to force a charging connector 120 from a charging port.

Figure 3:
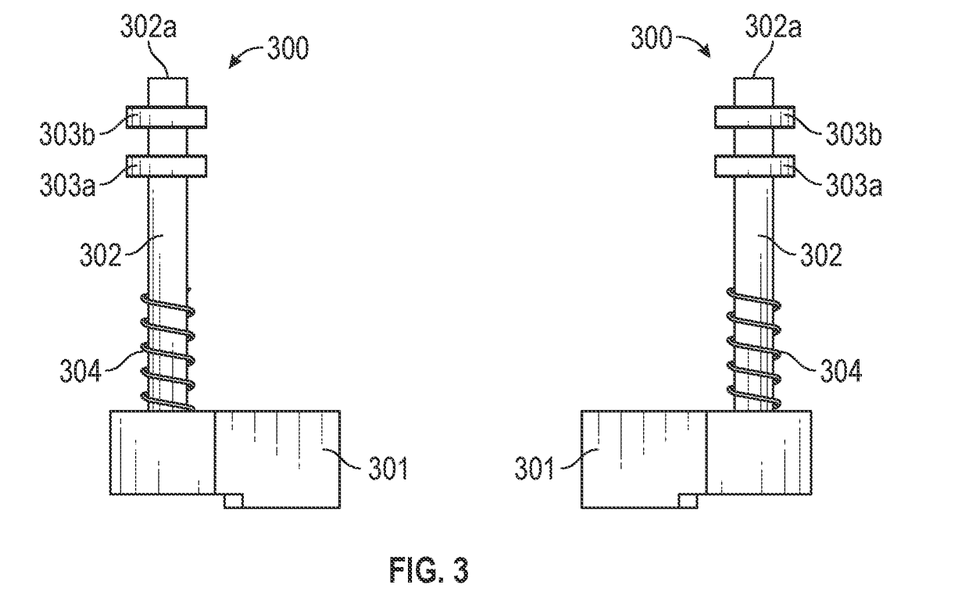
FIG. 3 provides an example of a pusher assembly that may be used in an ejector configured in accordance with embodiments of the present invention.

FIG. 3 is a top view of pusher assemblies 300 in isolation. Each pusher assembly 300 may include a pusher 301 that is connected to a shaft 302. A front flange 303a and a rear flange 303b may be formed on shaft 302 towards an end 302a opposite pusher 301. A spring 304 (or other biasing member) can be positioned around shaft 302 adjacent pusher 301.

Figure 4:
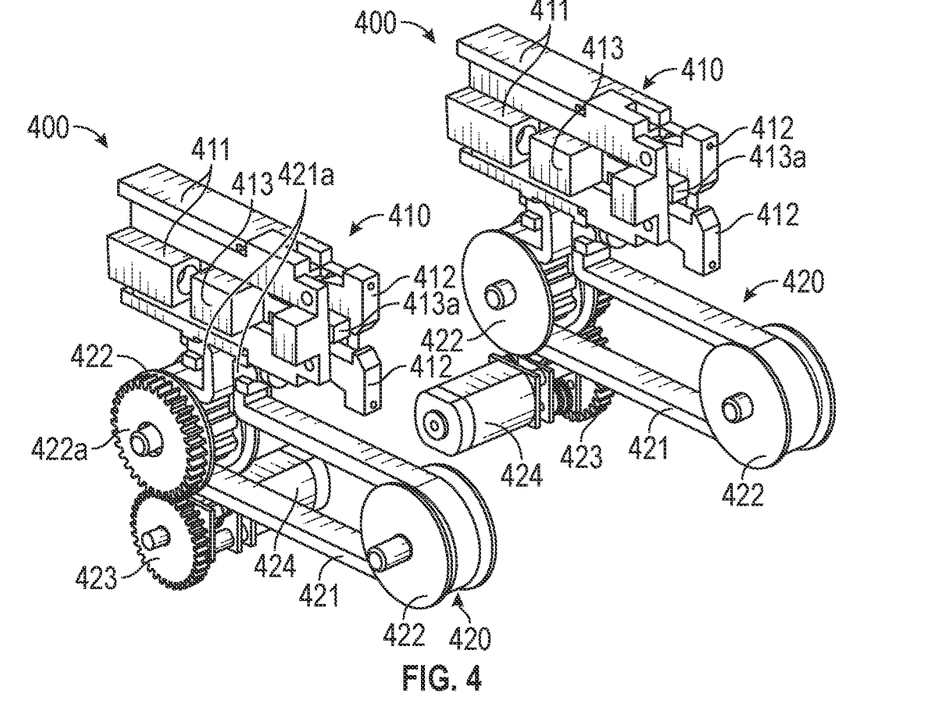
FIG. 4 provides an example of a retracting assembly that may be used in an ejector configured in accordance with embodiments of the present invention.

FIG. 4 is a front perspective view of retracting assemblies 400 in isolation. Each retracting assembly 400 can include a grabber assembly 410 and a driving assembly 420. Grabber assembly 410 is configured to grab a corresponding pusher assembly 300, and driving assembly 420 is configured to move a corresponding grabber assembly 410 to retract the corresponding pusher assembly 300.

Grabber assembly 410 includes a housing 411 from which one or more grabbers 412 extend frontwardly (two of which are shown in the depicted embodiment) and an actuator 413 that is configured to cause grabbers 412 to open and close. Actuator 413 can include an actuator arm 413a that contacts shaft 302 of the corresponding pusher assembly 300. As described in greater detail below, as actuator arm 413a contacts end 302a of shaft 302, actuator 413 can move rearwardly within housing 411 to cause grabbers 412 to open and close in a generally similar manner as a clicker mechanism of a ballpoint pen.

Driving assembly 420 includes a belt 421 having ends 421a that are coupled to housing 411 of grabber assembly 410. Belt 421 is routed around a pair of pullies 422 so that, when pullies 422 are rotated, ends 421a will move frontwardly or rearwardly to thereby drive grabber assembly 410 frontwardly or rearwardly. Driving assembly 420 may include a motor 424 for rotating pullies 422 such as via gears 423 and 422a.

Figure 5:
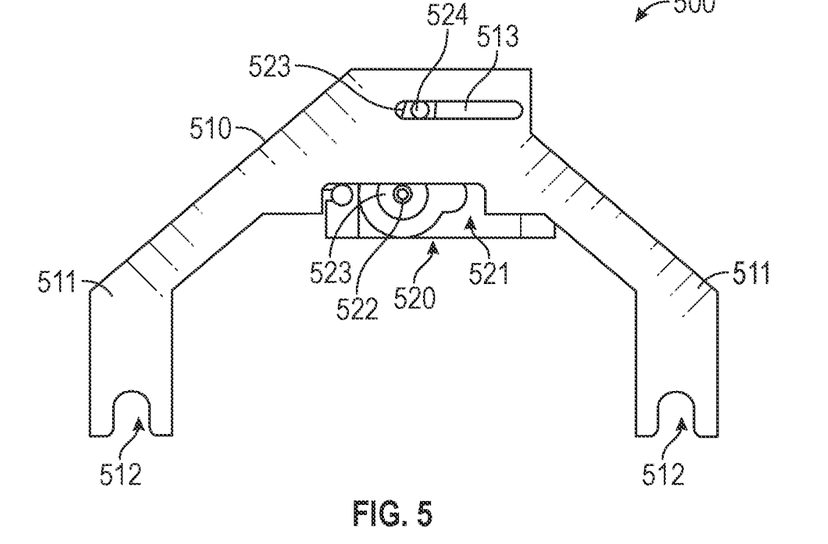
FIG. 5 provides an example of a locking assembly that may be used in an ejector configured in accordance with embodiments of the present invention.

FIG. 5 is a rear view of locking assembly 500 in isolation. Locking assembly 500 may include a locking member 510 forming one or more arms 511 (two or which are shown in the depicted embodiment). Each arm 511 may form a notch 512 that is configured to at least partially receive shaft 302 to thereby position arm 511 in front of front flange 303a. However, arm 511 could be configured in any suitable way to enable it to interface with front flange 303a for the purpose of locking pusher assembly 300 in the retracted/loaded position.

Locking member 510 can be configured to be moved between a raised position in which arms 511 do not interface with front flange 303a and a lowered position in which arms 511 interface with front flange 303a. To move locking member 510 between these raised and lowered positions, locking assembly 500 may include a driving assembly 520 having a motor 521, a shaft 522, a pivoting arm 523 and a pin 524. Pin 524 may insert into a slot 513 formed in a locking member 510. Because pin 524 is positioned at an end of pivoting arm 523 opposite shaft 522, as motor 521 rotates shaft 522, pin 524 will move locking mechanism 510 up or down as it slides within slot 513.

Figure 6A:
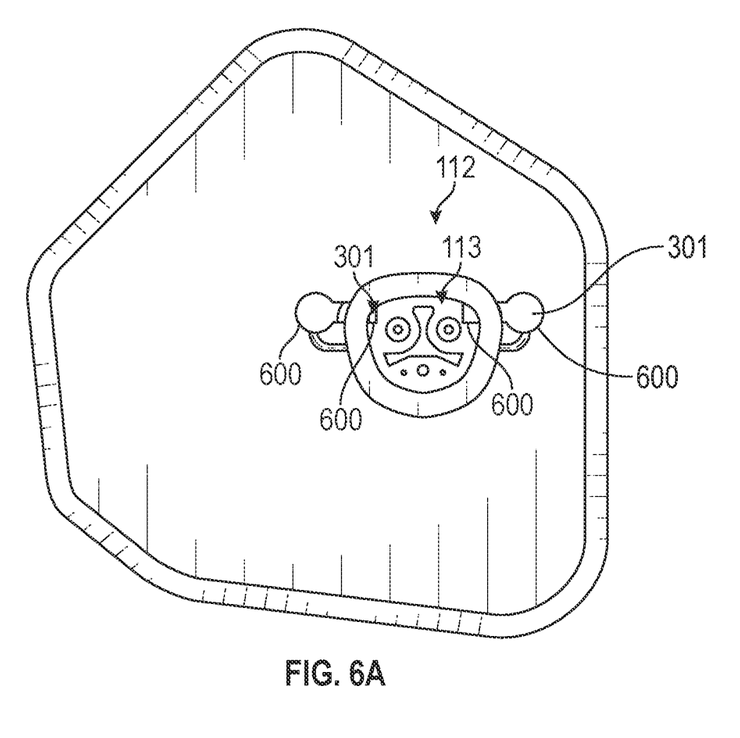
FIGS. 6A-6C are front, front perspective and side views respectively representing the state of the charging system shown in FIGS. 1A-1D after the ejector of FIG. 2 has ejected the charging connector from the charging port.
Figure 6B:
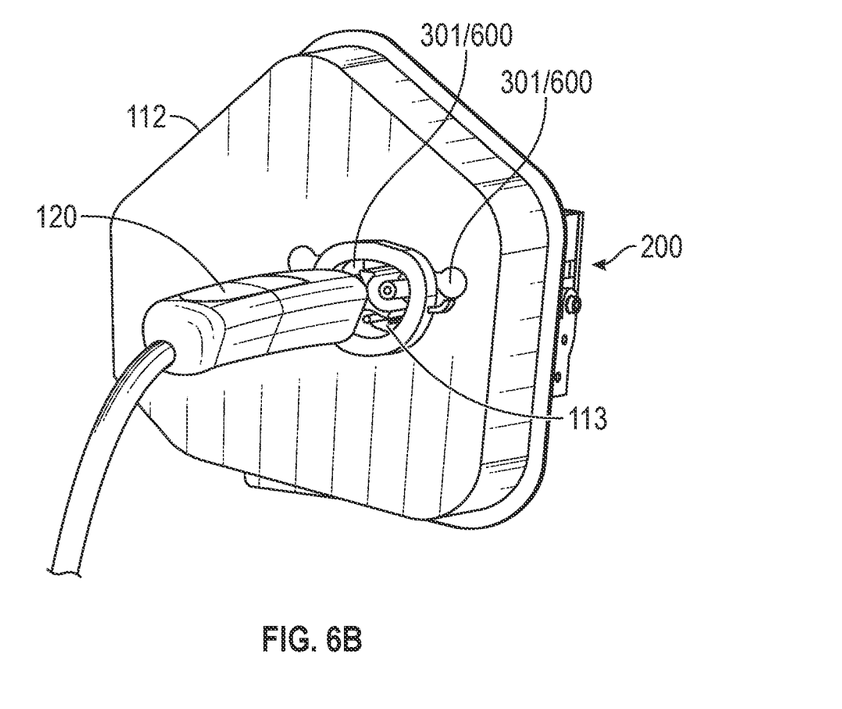
Figure 6C:
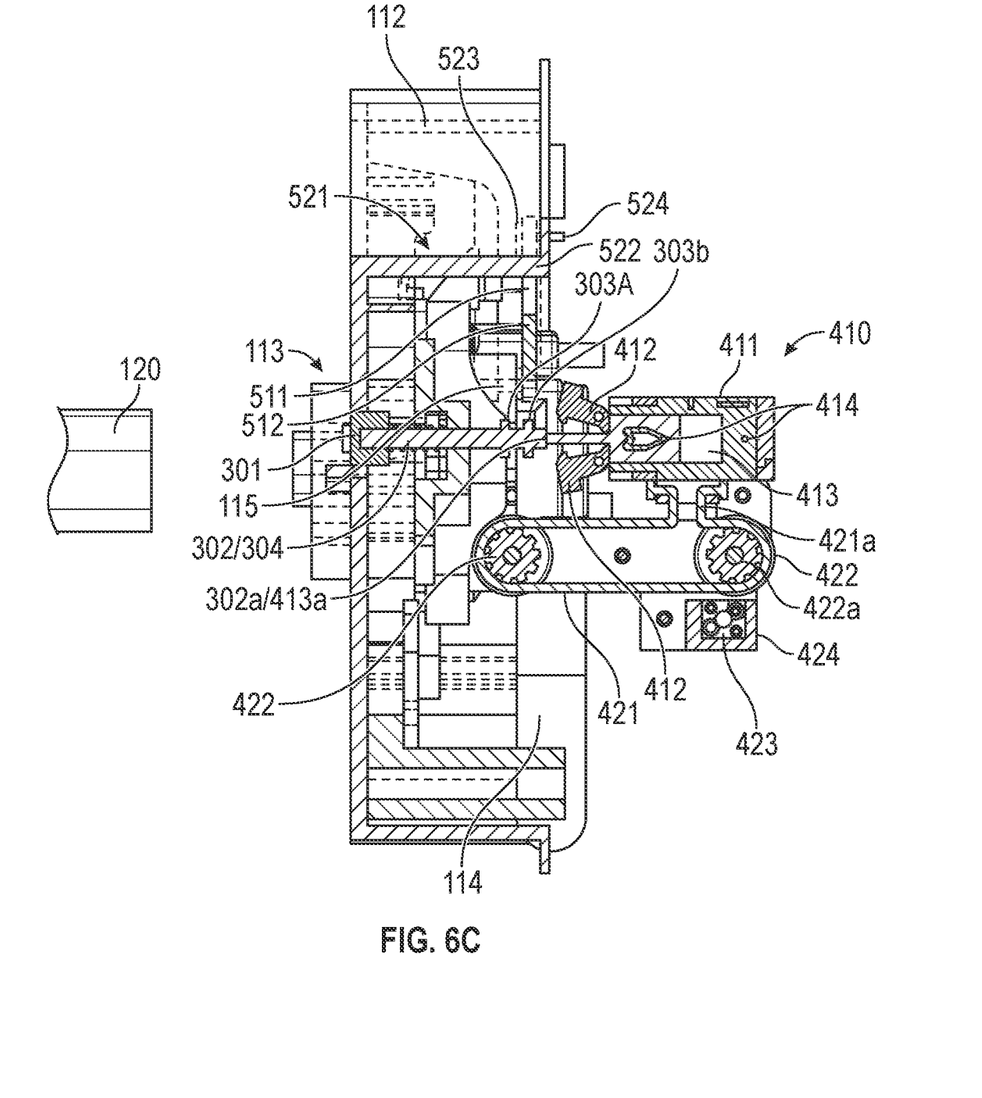

FIGS. 6A-6C are front, front perspective and side views respectively showing ejector 200 in its released configuration when it is used on Tesla 100 to eject charging connector 120. In other words, these figures can represent the state of ejector 200 immediately after it has ejected charging connector 120 or at least prior to being returned to a retracted/loaded configuration. To enable ejector 200 to be used on Tesla 100, cutouts 600 may be formed in internal housing 112 to allow pushers 301 to extend through internal housing 112. Notably, pushers 301, and therefore cutouts 600, can be within socket 113 so that pushers 301 will contact charging connector 120 when charging connector 120 is inserted into socket 113.

As shown in FIG. 6C, locking assembly 500 has been moved into the raised position which released pusher assemblies 300 thereby allowing springs 304 to force pushers 301 through cutouts 600 which in turn forced charging connector 120 from socket 113. In this released configuration, retracting assemblies 400 can be in a rearward position with grabbers 412 open. With retracting assemblies 400 in the rearward position, actuator 413 may be in a frontward position but actuator arm 413a may not contact end 302a of shaft 302 (or at least not sufficiently to force actuator 413 rearwardly). Notably, grabber assembly 410 may include a spring 414 (or other biasing member) that moves between connected V-shaped channels as actuator 413 is moved frontwardly and rearwardly. This configuration may cause grabber assembly 410 to function in a generally similar manner as a clicker mechanism of a ballpoint pen. However, the configuration causes grabbers 412 to repeatedly open and close as actuator 413 is moved. In particular, when actuator 413 is in a frontward position, it causes grabbers 412 to pivot open. In contrast, when actuator 413 is in a rearward position, it enables grabbers 412 to pivot closed. In some embodiments, grabbers 412 may be biased into the closed position such that they remain in the closed position unless actuator 413 is forced frontwardly against them to pivot them open (such as is shown in FIG. 6C).

Figure 7A:
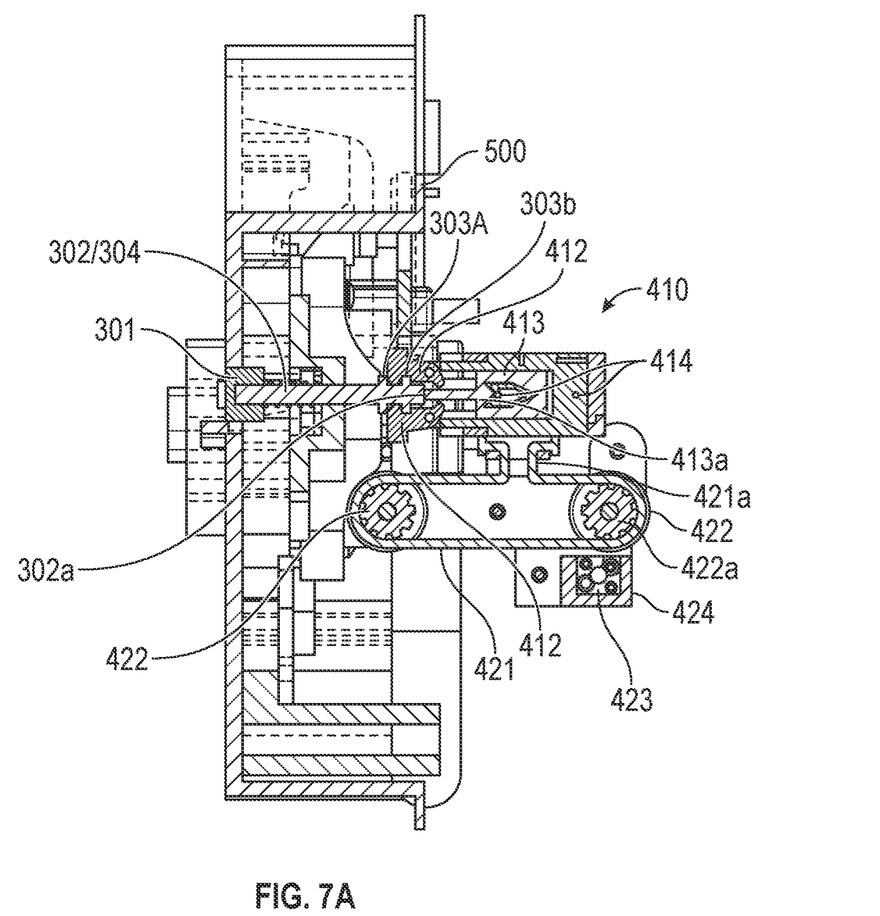
FIGS. 7A-7C provide an example of how the ejector of FIG. 2 can be transitioned back into the retracted/loaded state after ejecting the charging connector.
Figure 7B:
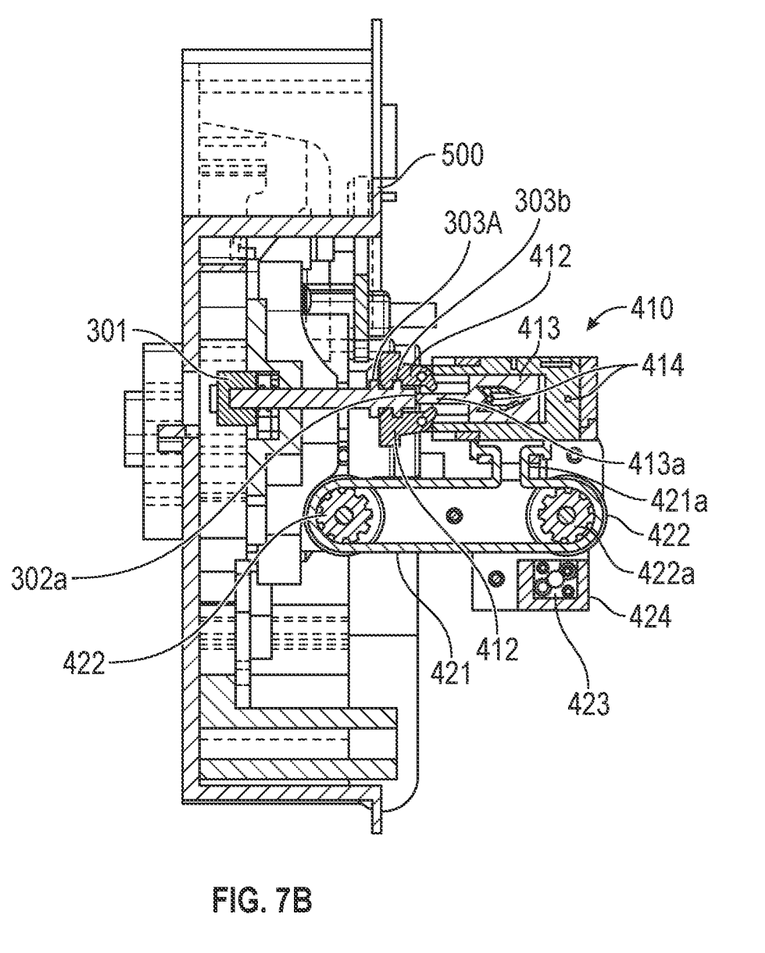
Figure 7C:
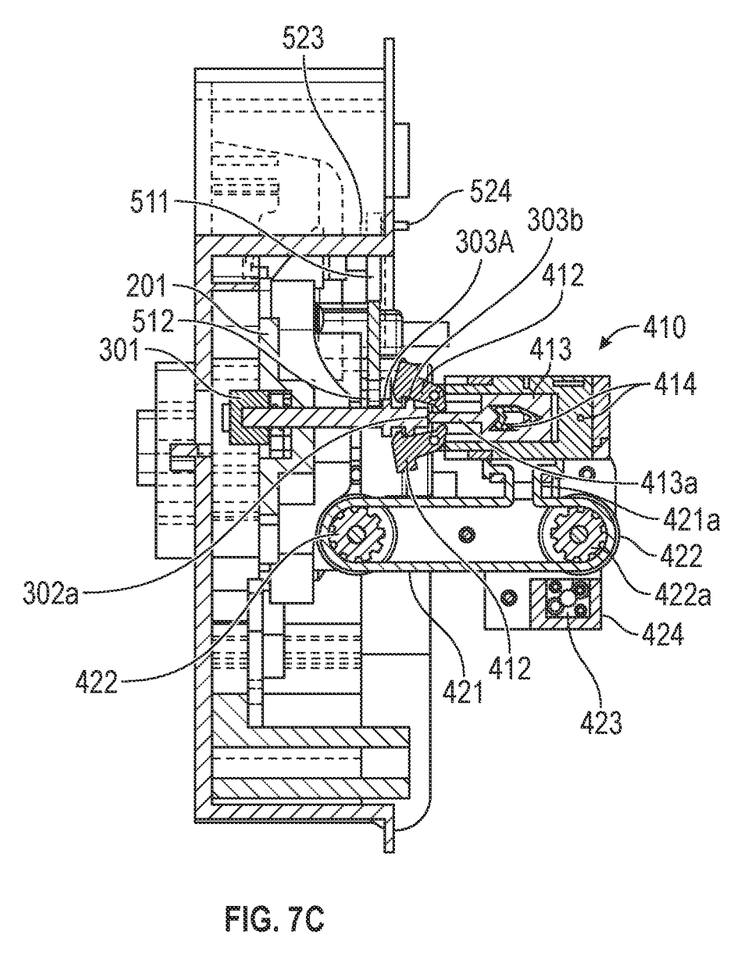

FIGS. 7A-7C illustrate how ejector 200 can be transitioned from the released configuration into a loaded configuration to await the next ejection. FIG. 7A represents a grabbing stage of the transition. In comparison to FIG. 6C, in FIG. 7A, driving assemblies 420 have driven grabber assemblies 410 frontwardly to thereby force actuator arm 413a against shaft 302. As a result, actuator 413 is moved rearwardly within housing 411 thereby enabling grabbers 412 to pivot to the closed position. When in the closed position, grabbers 412 can extend around rear flange 303b to thereby interlock grabbers 412 and shaft 302. Notably, spring 414 is in the frontward V-shaped channel and will retain actuator 413 in the rearward position until actuator 413 is forced further rearwardly into housing 411 to cause spring 414 to escape the frontward V-shaped channel.

FIG. 7B represents a retracting stage of the transition. In comparison to FIG. 7A, in FIG. 7B, driving assemblies 420 have driven grabber assemblies 410 rearwardly. Because grabbers 412 are interlocked with rear flange 303b, the rearward movement of grabber assemblies 410 will pull pusher assemblies 300 rearwardly. Importantly, pushers 301 are pulled rearwardly out from socket 113 so that charging connector 120 can be inserted into socket 113. Driving assemblies 420 may be configured to drive grabber assemblies 410 sufficiently rearward to ensure that front flange 303a is positioned rearward of arms 511. With pushers 301 pulled rearwardly, springs 304 will be compressed between pushers 301 and housing 201. This compression of springs 304 creates the potential energy for subsequently forcing pushers 301 against charging connector 120 to eject it from socket 113. In some embodiments, shafts 302 may include only a single flange. In such embodiments, grabber 412 and arm 511 may interface with the same, single flange.

FIG. 7C represents a locking stage of the transition. In comparison to FIG. 7B, in FIG. 7C, driving assembly 520 has driven locking member 510 downwardly to position notches 512 around shafts 302. Accordingly, arms 511 are positioned in front of front flanges 303a. Once arms 511 are positioned in front of front flanges 303a, driving assemblies 420 can drive grabber assemblies 410 frontwardly sufficient to release spring 414 from the front V-shaped channel to thereby allow actuator 413 to move freely within housing 411. As a result, grabbers 412 can pivot into the open position. Accordingly, after locking assembly 500 has locked pusher assemblies 300 in the retracted/loaded position and grabber assemblies 410 have released shafts 302, pusher assemblies 300 will be ready to be released to eject charging connector 120. Ejector 200 can remain in this state until triggered by the driver or another mechanism. Once triggered, ejector 200 can transition back into the position shown in FIGS. 6A-6C and the process shown in FIGS. 7A-7C can be repeated.

Although not shown, ejector 200 may include suitable control circuitry to control the operation of motors 424 and motor 521. For example, ejector 200 may include control circuitry for receiving a wired or wireless signal, and in response, can cause motor 521 to lift locking member 510 to thereby eject a charging connector. Then, the control circuitry can control motors 424 and motor 521 in proper sequence to perform the functionality shown in FIGS. 7A-7C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. An ejector comprising:
   one or more pusher assemblies that are configured to push a connector from a socket, wherein each of the one or more pusher assemblies comprises a pusher and a shaft;
   one or more retracting assemblies that are configured to move the one or more pusher assemblies into a retracted position, wherein each of the one or more retracting assemblies includes a grabber assembly that interfaces with the shaft of the corresponding pusher assembly to move the pusher assembly into the retracted position; and
   a locking assembly that is configured to retain the one or more pusher assemblies in the retracted position until a signal is received to eject the connector from the socket.

2. The ejector of claim 1, wherein each pusher is configured to extend through a housing surrounding the socket.

3. The ejector of claim 1, wherein the grabber assembly includes opposing grabbers that interface with a flange of the shaft of the corresponding pusher assembly.

4. The ejector of claim 3, wherein the grabber assembly selectively pivots the opposing grabbers between an open position and a closed position.

5. The ejector of claim 1, wherein each of the one or more retracting assemblies includes a driving assembly that moves the corresponding grabber assembly.

6. The ejector of claim 1, wherein the locking assembly interfaces with the shaft of the one or more pusher assemblies to retain the one or more pusher assemblies in the retracted position.

7. The ejector of claim 6, wherein each of the one or more pusher assemblies includes a spring that forces the corresponding pusher against the connector when the locking assembly releases the one or more pusher assemblies from the retracted position.

8. The ejector of claim 6, wherein the locking assembly includes one or more arms that interface with a flange on the shaft of the one or more pusher assemblies.

9. An ejector for a charging connector comprising:
   a housing configured to be secured to a housing of a charging port;
   a pusher assembly having a pusher that is configured to be selectively extended through the housing of the charging port, the pusher being coupled to a shaft;
   a retracting assembly having a grabber assembly and a driving assembly for driving the grabber assembly, the grabber assembly being configured to interface with the shaft to transition the pusher into a retracted position; and
   a locking assembly that interfaces with the shaft to retain the pusher in the retracted position, the locking assembly being configured to release the shaft to thereby enable the pusher to extend through the housing of the charging port to eject a charging connector.

10. The ejector of claim 9, wherein the pusher extends through a cutout formed in the housing of the charging port.

11. The ejector of claim 9, wherein the shaft includes a flange, and the grabber assembly includes one or more grabbers that interface with the flange.

12. The ejector of claim 9, wherein the locking assembly includes an arm that interfaces with a flange of the shaft.

13. The ejector of claim 9, wherein the pusher assembly includes a spring that is compressed between the pusher and the housing when the pusher is in the retracted position.

14. The ejector of claim 9, wherein the shaft has a front flange and a rear flange, and wherein the grabber assembly interfaces with the rear flange to transition the pusher into the retracted position and the locking assembly interfaces with the front flange to retain the pusher in the retracted position.

15. An ejector comprising:
    a housing;
    opposing pusher assemblies, each pusher assembly having a pusher;
    opposing retracting assemblies, each retracting assembly having a grabber assembly that retracts the corresponding pusher assembly into a retracted position; and
    a locking assembly that locks the pusher assemblies in the retracted position, the locking assembly being configured to release the pusher assemblies from the retracted position in response to a signal.

16. The ejector of claim 15, wherein the housing is coupled to an interior side of a housing of a charging port of an electric vehicle.

17. The ejector of claim 16, wherein each pusher extends through the housing of the charging port of the electric vehicle.

18. The ejector of claim 15, wherein each pusher assembly includes a spring that is compressed when the pusher assembly in retracted into the retracted position.

* * * * *